United States Patent [19]
Conrad et al.

[11] 3,993,914
[45] Nov. 23, 1976

[54] MOTOR VEHICLE HEADLIGHT CONTROL APPARATUS

[75] Inventors: John H. Conrad, Brosserd; Joseph P. Seemann, Ste. Julienne, both of Canada

[73] Assignee: Unican Security Systems, Ltd., Montreal, Canada

[22] Filed: Mar. 31, 1975

[21] Appl. No.: 563,349

[52] U.S. Cl. ............................ 307/10 LS; 307/141; 315/82; 317/141 S; 317/148.5 R
[51] Int. Cl.² ...................... B60Q 1/06; B60Q 1/08
[58] Field of Search ........... 307/10 BP, 10 LS, 288; 315/82, 83, 77; 317/141 S, 148.5 R

[56] References Cited
UNITED STATES PATENTS

| | | | |
|---|---|---|---|
| 3,581,276 | 5/1971 | Newman | 315/82 X |
| 3,626,239 | 12/1971 | Brock | 307/10 LS X |
| 3,689,806 | 9/1972 | Saita | 307/10 LS X |
| 3,818,267 | 6/1974 | Hill et al. | 315/82 |

*Primary Examiner*—J D Miller
*Assistant Examiner*—Harry E. Moose, Jr.
*Attorney, Agent, or Firm*—Ira Milton Jones

[57] ABSTRACT

In a vehicle having an ignition switch, headlights and a storage battery, a relay has its winding in series with the battery and the collector-emitter circuit of a transistor and has normally open contacts in a headlight energizing circuit. A resistance-capacitance time delay circuit, connected with the ignition switch, controls bias of the transistor. Hence the transistor conducts whenever the ignition switch is "on" and for a short time after it is turned off; and while it conducts, the relay contacts are closed and the lights are energized.

4 Claims, 1 Drawing Figure

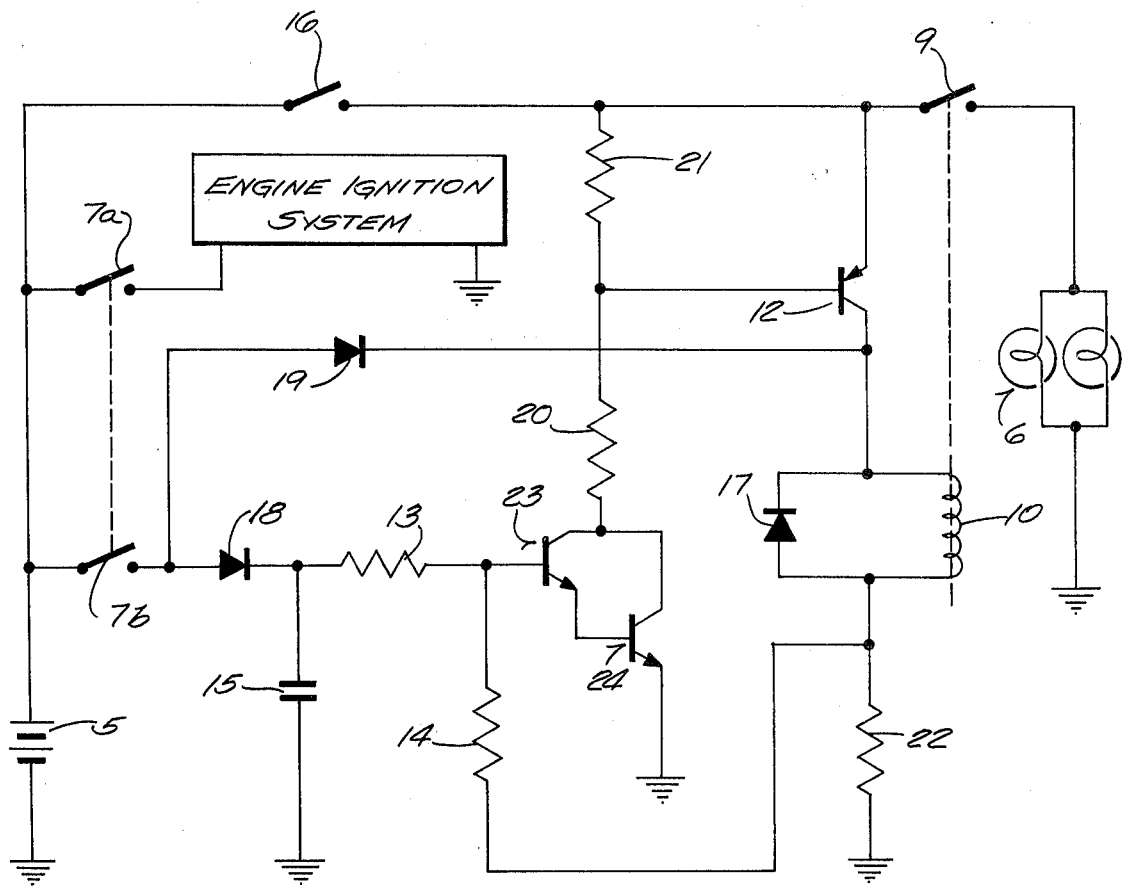

MOTOR VEHICLE HEADLIGHT CONTROL APPARATUS

This invention relates to apparatus for controlling the energization of vehicle lights, and is more particularly concerned with apparatus which causes the headlights of an automotive vehicle to remain lighted for a predetermined time after the engine of the vehicle is stopped, and which also prevents the vehicle battery from being discharged if the manually controllable switch for the lights has been left in the "on" position.

The headlights of automotive vehicles are usually controlled by a manual switch. Most drivers know that it is all too easy to forget to turn off the headlight switch when leaving the vehicle, and they are well aware of the penalty for such neglect. Because the headlights draw a considerable amount of electric power, letting them burn for a few hours while the engine is not running can discharge the storage battery to the point where it will not start the engine.

One solution to this problem that has been incorporated in certain automobiles is to connect a set of contacts of the ignition switch in series with the usual headlight switch, so that the headlights are off whenever the ignition is off. While solving one problem, however, that solution creates other ones. If the headlights are to be used when the vehicle engine is not running, the ignition switch must nevertheless be in the "on" position as long as the lights are to be on. In such circumstances the vehicle may have to be left unattended for a short time, and a conscientious driver is understandably reluctant to walk away from his car with the key in the ignition switch and the switch on.

Another headlight problem that has not heretofore been solved satisfactorily arises when the motorist must park his vehicle in a very dark location. For his safety and convenience as he is walking away from the vehicle it would be desirable to have the headlights remain lighted for a time after he gets out of it. But if the lights are manually controlled, they will of course continue to burn until he gets back to the vehicle, and by that time they may have drained the battery of all its charge.

In recent years, in an attempt to solve this latter problem, certain automobiles have been equipped with a timing device by which the lights could be caused to burn for a predetermined interval. The device comprised a switch mechanism that was connected across the manually operable headlight switch and a time delay actuator device for the switch mechanism. The actuator device had to be manually "armed," and such arming had to be done just before the motorist left the car inasmuch as the actuator opened the switch mechanism a predetermined time after being armed.

The device just described kept the lights turned on at times when they were wanted, but it could also leave the lights burning when they were not wanted. If the manually controlled headlight switch was not in its "off" position, the headlights continued to burn after the delay interval had expired. Furthermore, the motorist was given no reminder that he had neglected the headlight switch, since he expected to see the headlights burning as he walked away from the vehicle.

It is apparent that the problems of motor vehicle headlight control have not heretofore escaped attention. The above described control systems reflect an appreciation of the urgent need for a completely satisfactory headlight control arrangement, but it is apparent from the deficiencies in each of those prior expedients that the application of mere skill has not sufficed to satisfy the recognized need.

Thus the general object of the present invention is to provide headlight control apparatus that causes the headlights of a motor vechicle to continue to burn for a predetermined and limited time after the engine has been stopped, and whereby the lights are turned off automatically at the end of that time even though a manually controlled switch for the headlights is still in its "on" position.

Another specific object of the invention is to provide headlight control apparatus that requires no attention on the part of the driver, and which, when the use of headlights is desired, can cause the lights to be turned on substantially concurrently with starting of the engine and to remain on for a predetermined interval after the engine is stopped, turning them off automatically at the end of that interval.

Another specific object of the invention is to provide a vehicle headlight control device which draws very little current at times when the headlights burn, so that the device adds only negligibly to the power drain represented by the headlights, and which draws no current after it has turned off the headlights, so that the device in itself cannot drain down the vehicle battery no matter how long the vehicle is parked with its engine off.

It is perhaps unnecessary to add that it is also an object of the invention to provide a headlight control device that allows the headlights to be turned off and kept off whenever they are not wanted or needed.

With these observations and objectives in mind, the manner in which the invention achieves its purpose will be appreciated from the following description and the accompanying drawing, which exemplifies the invention, it being understood that changes may be made in the specific apparatus disclosed herein without departing from the essentials of the invention set forth in the appended claims.

The accompanying drawing illustrates one complete example of an embodiment of the invention constructed according to the best mode so far devised for the practical application of the principles thereof, and in which:

The single FIGURE is a circuit diagram of apparatus embodying the principles of this invention.

Referring now more particularly to the accompanying drawing, the numeral 5 designates a motor vehicle battery that serves as a source of electric power for the energization of lights 6. For purposes of explanation it will be assumed that the battery 5 is a storage battery which is charged whenever the vehicle engine is running, and that the lights 6 are the vehicle headlights. It will be appreciated, however, that there are analogous systems of other types to which the invention may be applied.

Most automotive vehicles are equipped with a so-called ignition switch mechanism that actually comprises a plurality of switches controlled by a common actuator; and in the present case the ignition switch mechanism 7 is illustrated in simplified form as comprising a ganged pair of single-pole single-throw switches, one of them, designated by 7a, being connected to control the engine ignition system, and the other, designated by 7b, being connected in the headlight control circuitry of this invention, as explained hereinafter. Both switches are of course connected with the ungrounded terminal of the battery, which is herein assumed to be its positive terminal.

The apparatus of this invention for control of the headlights 6 comprises, in general, a headlight switch 16 connected with the positive terminal of the battery and a headlight energizing circuit and a headlight control circuit, both of which are connected with the switch 16. The headlight energizing circuit comprises the headlights 6 and the normally-open contacts 9 of a relay 8, connected in series with one another and the switch 16. The headlight control circuit comprises the winding 10 of the relay 8 and a transistor 12. That winding and transistor are connected in series with one another, with the switch 16, and with a feedback resistor 22.

When the transistor 12 is conducting, the winding 10 of the relay 8 is energized and the contacts 9 of the relay are therefore closed for headlight energization. Conductivity of the transistor 12 is controlled in response to the condition of a resistance-capacitance time delay circuit comprising a capacitor 15 and resistors 13 and 14. The resistance-capacitance circuit is connectable with the battery through the switch 7b of the ignition switch and is connected with the base of transistor 12 through a bias control circuit that comprises transistors 23 and 24 and resistors 20 and 21.

In the illustrated arrangement, the headlight energizing circuit comprising the relay contacts 9 and the headlights 6 is connected in parallel with the headlight control circuit comprising the winding 10 and transistor 12. Hence, when the headlight switch 16 is open, no current can flow through either the headlight energizing circuit or the headlight control circuit, and the headlights do not burn. In view of the automatic control of the lights provided for by the apparatus of the present invention, the headlight switch 16 can be regarded as merely a means for turning off the headlights when they are not needed. If burning the headlights in the daytime is not considered objectionable, the headlight switch 16 can safely be left in the "on" position at all times, or could even be omitted.

It will be understood that the ignition switch mechanism can be a conventional one having a defined "start" position and which is so arranged that when it is that position it disconnects the headlights and other electrical accessories from the battery.

The bias control circuit that comprises transistors 23 and 24 and resistors 20 and 21 is also connected in series with the battery 5 and the headlight switch 16 and in parallel with the headlight energizing circuit and the headlight control circuit, so that it draws no current at times when the headlights are intended to be off.

A biasing circuit for the transistors 23 and 24, which are connected with one another in a two-stage amplifier arrangement, comprises the capacitor 15 and the resistors 13 and 14 of the time delay circuit, together with the feedback resistor 22; and this biasing circuit is essentially in series with the ignition switch 7b. Hence biasing current can flow in the base-emitter junctions of the transistors 23 and 24, through the resistor 13, whenever the switch 7b is closed.

The closed condition of the switch 7b also provides for the charging of the capacitor 15 which is then in effect connected across the battery 5. When switch 7b is subsequently opened, upon shutting off the vehicle ignition system, the capacitor 5 discharges through the resistor 13 and the series-connected base-emitter circuits of transistors 23 and 24. If the headlight switch 16 is closed at the time the ignition is cut off, transistors 23, 24 and 12 continue to conduct, and the lights continue to burn, until the charge on the capacitor is insufficient to maintain saturation of transistors 23 and 24. Switching off of those transistors of course switches off transistor 12. The resistance and capacitance values of the time delay circuit are so chosen that the transistors 23 and 24, and hence transistor 12, remain conducting for a time interval on the order of thirty seconds to one minute following opening of the ignition switch 7b. At the end of this interval the headlights are of course turned off by opening of the relay contacts 9.

For long life of the relay contacts 9, it is important that there be no gradual change in current through the relay winding 10 that would encourage impositive opening or closing of the contacts. This is to say that the transistor 12 should be operating at saturation whenever it is conducting any current, and should be controlled for rapid turnon and cutoff. Such operation of the transistor 12 is assured by the bias control comprising transistors 23 and 24 in their cooperation with the feedback resistor 22.

The feedback resistor 22 is connected between the relay winding 10 and ground. The resistors 13 and 14 can be regarded as connected in series with one another and the feedback resistor 22, between the capacitor 15 and ground. The base of transistor 23 is connected with the junction of resistors 13 and 14, and the base of transistor 24 is connected in the collector-emitter circuit of transistor 23.

The resistors 20 and 21 are connected in series with one another and with the headlight switch 16, and the collector-emitter circuits of the two transistors 23 and 24 are connected in parallel with one another and in series with those two resistors. The base of the transistor 12 is connected with the junction of the resistors 20 and 21.

It will be apparent that the two-stage amplifier comprising transistors 23 and 24 affords a high current gain in the circuit that controls bias of the transistor 12. Of more importance is the cooperation of the transistors 23 and 24 with the feedback resistor 22. It will be observed that there is a higher potential at the junction of resistors 14 and 22 when the transistor 12 is conducting at saturation than when little or no current flows in the collector-emitter circuit of that transistor. As a result, transistors 23 and 24 are biased with what is in effect a positive feedback from the collector-emitter circuit of transistor 12, whereby the two-stage amplifier comprising transistors 23 and 24 is rendered very non-linear. So long as the charge on the capacitor 15 is above a certain value, transistors 23 and 24 —and hence also transistor 12 —will conduct at saturation; but when the charge drops to that level, al three transistors switch off. This is to say that transistors 23 and 24 to switch on and switch off rapidly, and to conduct at saturation or not at all; and consequently transistor 12 tends to operate in the same manner. It will be seen that the connection of the resistor 14 in series with the feedback resistor 22, and hence in feedback relation to the winding circuit, has the beneficial effect of presenting a high impedance to capacitor 15 as it discharges, so that a comparatively long time constant for the time delay circuit is obtained with a relatively small value of capacitance.

A diode 17 is preferably connected across the winding 10 of the relay to protect the transistor 12 against back voltage spikes that may develop when the transistor 12 is rapidly cut off.

A rectifier diode 18, connected in the time delay circuit between the capacitor 15 and the ignition switch 7b, prevents discharge of capacitor 15 to other circuits controlled by the ignition switch.

In the illustrated arrangement, so long as the headlight switch 16 is closed and the capacitor 15 is charged, current flows through the relay winding 10 and the transistor 12, and must do so to keep the relay contacts closed and the headlights burning. However, such energization of the relay winding represents a very negligible current consumption, inasmuch as the winding can be one that draws as little as 0.3 milliamperes. At times when the engine is running and charging the battery, such a tiny current drain is of no consequence, and it continues for only a limited time after the engine is stopped. Note that after the condenser 15 has discharged, the apparatus draws no current whatsoever from the battery.

As a safety feature, a diode 19 can be connected between the ignition switch 7b and the relay winding 10, in bypassing relation to the bias control circuit and the transistor 12. In the event of a failure of any of the transistors, the headlights will nevertheless be energized so long as both the headlight switch 16 and the ignition switch 7b are on, inasmuch as the relay winding will then be energized through the diode 19. The capacitor cannot discharge through the diode 19 because the diode 18 is connected between the capacitor and the bypass circuit that comprises the diode 19.

By way of example of specific component values successfully used in apparatus of this invention for a 12-volt automotive system, the capacitor 15 can have a capacitance of 470 mfd. and each of the resistors 13 and 14 can have a resistance of 27k ohms. Each of the diode rectifiers 17, 18 and 19 can be an IN4001. Each of the transistors 23 and 24 can be a 2N5526, and transistor 12 can be a TSC101. Resistor 22 can be 1.1 ohms, resistor 20 can be 560 ohms and resistor 21 can be 100 ohms.

From the foregoing description taken with the accompanying drawing it will be apparent that this invention provides a vehicle light control circuit which automatically turns off the lights of a motor vehicle a predetermined time after its ignition is switched off, causes no current drain after the lights go out, and requires no arming or other attention but, instead, performs its function whenever the headlight switch is "on."

Those skilled in the art will appreciate that the invention can be embodied in forms other than as herein disclosed for purposes of illustration.

The invention is defined by the following claims.

We claim:

1. Apparatus for controlling lights on a vehicle that has an engine, an ignition switch which is in an "on" position when the engine is running and can be moved to an "off" position to stop the engine, and a battery which provides a source of electrical power for the lights, said apparatus being characterized by:
    A. a relay having
        1. a winding and
        2. switching contacts that are normally open but are closed when the winding is energized;
    B. means connecting said switching contacts in series with the battery and the lights to provide a light power circuit through which the lights can be energized from the battery when the switching contacts are closed;
    C. a current valving device of the type having a control terminal and a pair of other terminals, and which allows current to flow between said other terminals only when current flows between its control terminal and one of said other terminals;
    D. means connecting said other terminals of the current valving device in a series circuit that comprises the battery and the winding of the relay, so that the relay winding is energized whenever current flows in a circuit in which the control terminal is connected;
    E. time delay circuit means connected with the control terminal and with the battery through the ignition switch, to provide for current flow between the control terminal and said one other terminal at all times that the ignition switch is in its "on" position and for a predetermined time after the ignition switch is moved to its "off" position; and
    F. means comprising a diode connected between the ignition switch and the winding of the relay, in bypassing relation to the current valving device and the time delay circuit means, to enable the lights to be energized when the ignition switch is in its "on"1 position notwithstanding any failure of said current valving device or said time delay circuit means.

2. Apparatus for controlling lights on a vehicle or the like that has an ignition switch which is in an "on" position when an engine in the vehicle is operating and can be moved to an "off" position to stop the engine, and a battery which provides a source of electrical power for the lights, said apparatus being characterized by:
    A. a relay having
        1. a winding and
        2. a pair of normally open contacts that are closed when the winding is energized;
    B. means for connecting said contacts in a series circuit with the battery and the lights to provide for energization of the lights when the contacts are closed;
    C. transistor means having a base terminal and having a collector-emitter junction connected in series with said winding and connectable with the battery, for controlling energization of the winding in accordance with bias on said base terminal;
    D. means providing a time delay switch and connectable with the ignition switch and comprising a chargeable element that can be charged whenever the ignition switch is in its "on" position and can discharge at a controlled rate when the ignition switch is moved to its "off" position;
    E. amplifier means connected with said time delay circuit to be responsive to the state of charge of said chargeable element and connected with the base terminal of the transistor means to control bias on the same; and
    F. means for effecting rapid switching on and cutoff of said transistor means, to insure positive opening and closing of the relay contacts, the last-named means comprising means connected with the collector-emitter circuit of the transistor means and in positive feedback relation to said amplifier means.

3. The apparatus of claim 2, further characterized by:
    G. a diode connected between the ignition switch and said winding, in bypassing relation to the time delay circuit means, the amplifier means and the transistor means, to provide for energization of the lights whenever the ignition switch is in its "on" position, notwithstanding failure of any of said bypassed means.

4. Apparatus for controlling lights on a vehicle or the like that has an engine, an ignition switch which is in an "on" position when the engine is running and can be moved to an "off" position to stop the engine, and a battery which provides a source of electrical power for the lights, said apparatus being characterized by:
   A. a relay having
      1. a winding and
      2. a pair of normally open contacts that are closed when the winding is energized;
   B. means for connecting said contacts in a series circuit with the battery and the lights to provide for energization of the lights when the contacts are closed;
   C. transistor means connected in series circuit with said winding and connectable with the battery, said transistor means being responsive to a biasing current to cause current to flow through said winding;
   D. biasing circuit means connected with the transistor means and connectable with the ignition switch to provide for flow of biasing current through the transistor means at times when the ignition switch is in its "on" position and for a predetermined time after it has been moved from its "on" to its "off" position, said biasing circuit means comprising
      1. a resistance-capacitance time delay circuit in which a capacitor is connected to be charged when the ignition switch is in its "on" position and to be slowly discharged when the ignition switch is moved from its "on" to its "off" position;
      2. bias control circuit means comprising amplifier means connected with said transistor means and with the resistance-capacitance time delay circuit; and
      3. means providing a positive feedback connection from said series circuit comprising the transistor means to said amplifier means, whereby the amplifier means is caused to have a substantially non-linear response to discharge of the capacitor and thus causes the transistor means to conduct substantially at saturation when the charge on the capacitor is above a predetermined value and to be switched off when said charge reaches said value.

* * * * *

UNITED STATES PATENT OFFICE
CERTIFICATE OF CORRECTION

PATENT NO. : 3,993,914
DATED : November 23, 1976
INVENTOR(S) : JOHN H. CONRAD ET AL It is certified that error appears in the above-identified patent and that said Letters Patent are hereby corrected as shown below:

Col. 4:     Line 54 (actual count) change "level, al" to --value, all--

Line 55 (actual count) insert "tend" before "to" second occurrence.

Col. 6:     Line 25, delete "I" at end of the line.

Line 48, change "switch and" to --circuit--

Signed and Sealed this

Twelfth Day of April 1977

[SEAL]

Attest:

RUTH C. MASON
*Attesting Officer*

C. MARSHALL DANN
*Commissioner of Patents and Trademarks*